(12) United States Patent
Chang et al.

(10) Patent No.: US 10,757,310 B1
(45) Date of Patent: Aug. 25, 2020

(54) MINIATURE IMAGE PICKUP MODULE AND MANUFACTURING METHOD THEREOF

(71) Applicant: PRIMAX ELECTRONICS LTD., Taipei (TW)

(72) Inventors: Ching-Hui Chang, Taipei (TW); Sheng-Hsiang Chiu, Taipei (TW); Yi-Hou Chen, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 16/548,057

(22) Filed: Aug. 22, 2019

(30) Foreign Application Priority Data

Jun. 21, 2019 (TW) .............................. 108121781 A

(51) Int. Cl.
*H04N 5/225* (2006.01)
*H04N 1/409* (2006.01)

(52) U.S. Cl.
CPC ........... *H04N 5/2257* (2013.01); *H04N 1/409* (2013.01); *H04N 5/2253* (2013.01)

(58) Field of Classification Search
CPC .................................................. H04N 5/2257
USPC .......................................................... 348/373
See application file for complete search history.

(56) References Cited

U.S. PATENT DOCUMENTS

| | | | | |
|---|---|---|---|---|
| 6,002,437 A | * | 12/1999 | Morioka | H04N 5/2252 348/373 |
| 2008/0055438 A1 | * | 3/2008 | Lee | H04N 5/2254 348/294 |

* cited by examiner

*Primary Examiner* — Joel W Fosselman
(74) *Attorney, Agent, or Firm* — WPAT, PC

(57) ABSTRACT

A miniature image pickup module and a manufacturing method are provided. The manufacturing method includes the following steps. In a step (a), a substrate with two vertical conductor lines is provided. In a step (b), a photosensitive element is provided. The photosensitive element is fixed on the substrate. The two vertical conductor lines are penetrated through two openings of the photosensitive element. Moreover, first ends of the vertical conductor lines are located away from the substrate and partially exposed to a top surface of the photosensitive element. In a step (c), the first ends of the vertical conductor lines are electrically connected with the corresponding bonding pads. In a step (d), a lens module is fixed on the substrate to cover a top side of the photosensitive element, so that the miniature image pickup module is manufactured.

19 Claims, 6 Drawing Sheets

MINIATURE IMAGE PICKUP MODULE AND MANUFACTURING METHOD THEREOF

FIELD OF THE INVENTION

The present invention relates to an image sensing assembly, and more particularly to an image pickup module.

BACKGROUND OF THE INVENTION

With the advent of the Internet age, people can use electronic devices to communicate and interact with each other at any time and in any place. In addition, an image pickup module has gradually become one of the essential components of the electronic device. The electronic devices with the image pickup modules can be used to make video calls to have the face-to-face talk. Moreover, the electronic devices with the image pickup modules can be used to photograph the surrounding scenery or objects at any time and in any place and share photos with family members or friends.

Conventionally, a photosensitive element of the image pickup module is electrically connected with the circuitry of a substrate through a wire bonding process. However, if the conductive wire is broken or the conductive wire is not well brazed during the wire bonding process, the production yield of the image pickup module is adversely affected. Moreover, while the conductive wire is brazed, the wire bonding tool may damage the photosensitive element. Moreover, according to the conventional method of packaging the photosensitive element, it is necessary to retain a wire-bonding site on the substrate. Consequently, it is difficult to reduce the volume of the image pickup module. In other words, the conventional method of packaging the photosensitive element cannot meet the miniaturization requirements of designing electronic devices. Moreover, the flexibility and the degree of freedom about the electronic wiring layout of the electronic device are impaired.

For solving the above drawbacks, there is a need of providing an image pickup module in order to increase the production yield of the photosensitive element and reduce the overall volume.

SUMMARY OF THE INVENTION

The present invention provides a miniature image pickup module in order to increase the production yield of the photosensitive element and reduce the overall volume.

In accordance with an aspect of the present invention, a manufacturing method of a miniature image pickup module is provided. The manufacturing method includes the following steps. In a step (a), a substrate is provided, wherein two vertical conductor lines are formed on a surface of the substrate. In a step (b), a photosensitive element is provided. The photosensitive element includes a top surface, a bottom surface, two openings and two bonding pads. The two openings run through the top surface and the bottom surface. The two bonding pads are installed on the top surface. The photosensitive element is fixed on the substrate. The two vertical conductor lines are penetrated through the corresponding openings. Moreover, first ends of the vertical conductor lines are located away from the substrate and partially exposed to the top surface. In a step (c), the first ends of the vertical conductor lines are electrically connected with the corresponding bonding pads. In a step (d), a lens module is fixed on the substrate to cover a top side of the photosensitive element, so that the miniature image pickup module is manufactured.

In an embodiment, the manufacturing method further includes a step (e) of cutting off a lateral edge of the miniature image pickup module along at least one cutting surface.

In an embodiment, the step (b) further includes a step of forming a first glue layer between the bottom surface of the photosensitive element and the substrate, so that the photosensitive element and the substrate are combined together.

In an embodiment, the step (c) further includes a step of bending the first ends of the vertical conductor lines and connecting the first ends of the vertical conductor lines with the corresponding bonding pads.

In an embodiment, the step (c) further includes a step of forming solder balls on the top surface of the photosensitive element to cover the first ends of the corresponding vertical conductor lines and the corresponding bonding pads, so that the first ends of the corresponding vertical conductor lines are electrically connected with the corresponding bonding pads.

In the step (d), the lens module includes a lens group and a holder, wherein the lens group is held by the holder.

In an embodiment, the manufacturing method further includes a step of forming a second glue layer on the substrate and an outer side of the photosensitive element, so that the holder is fixed on the substrate through the second glue layer and the lens module is aligned with the photosensitive element.

In an embodiment, a portion of the second glue layer is spread to cover the first ends of the vertical conductor lines and the bonding pads.

In accordance with another aspect of the present invention, a miniature image pickup module is provided. The miniature image pickup module includes a substrate, a photosensitive element and a lens module. Moreover, two vertical conductor lines are formed on a surface of the substrate. The photosensitive element is fixed on the substrate, and includes a top surface, a bottom surface, two openings and two bonding pads. The two openings run through the top surface and the bottom surface. The two openings are aligned with the two vertical conductor lines. The two vertical conductor lines are penetrated through the corresponding openings. Moreover, first ends of the vertical conductor lines are located away from the substrate and partially exposed to the top surface. The two bonding pads are installed on the top surface. The lens module is fixed on the substrate to cover a top side of the photosensitive element. The first ends of the vertical conductor lines are electrically connected with the corresponding bonding pads.

In an embodiment, the first ends of the vertical conductor lines are bent toward the corresponding bonding pads, so that the first ends of the vertical conductor lines are connected with the corresponding bonding pads.

In an embodiment, solder balls are formed on the top surface of the photosensitive element to cover the first ends of the corresponding vertical conductor lines and the corresponding bonding pads, so that the first ends of the corresponding vertical conductor lines are electrically connected with the corresponding bonding pads.

In an embodiment, a first glue layer is formed between the bottom surface of the photosensitive element and the substrate, so that the photosensitive element and the substrate are combined together.

In an embodiment, the lens module includes a lens group and a holder, wherein the lens group is held by the holder.

In an embodiment, a second glue layer is formed on the substrate and an outer side of the photosensitive element, so that the holder is fixed on the substrate through the second glue layer and the lens module is aligned with the photosensitive element.

In an embodiment, a portion of the second glue layer is spread to cover the first ends of the vertical conductor lines and the bonding pads.

In an embodiment, at least one cutting surface is formed at a lateral edge of the miniature image pickup module.

In an embodiment, a first inner periphery of the opening is close to a center line of the photosensitive element, and a linear distance between the first inner periphery of the opening and the cutting surface is in a range between 0.15 mm and 0.20 mm.

In an embodiment, a linear distance between the first inner periphery of the opening and a lateral side of the photosensitive element is in a range between 0.10 mm and 0.15 mm.

In an embodiment, a linear distance between the lateral side of the photosensitive element and the cutting surface is 0.05 mm.

The above objects and advantages of the present invention will become more readily apparent to those ordinarily skilled in the art after reviewing the following detailed description and accompanying drawings, in which:

BRIEF DESCRIPTION OF THE DRAWINGS

FIGS. 2A-1 and 2A-2 schematically illustrate the steps of the manufacturing method of the miniature image pickup module according to a first embodiment of the present invention;

FIGS. 2B-1 and 2B-2 schematically illustrate the steps of the manufacturing method of the miniature image pickup module according to a second embodiment of the present invention.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
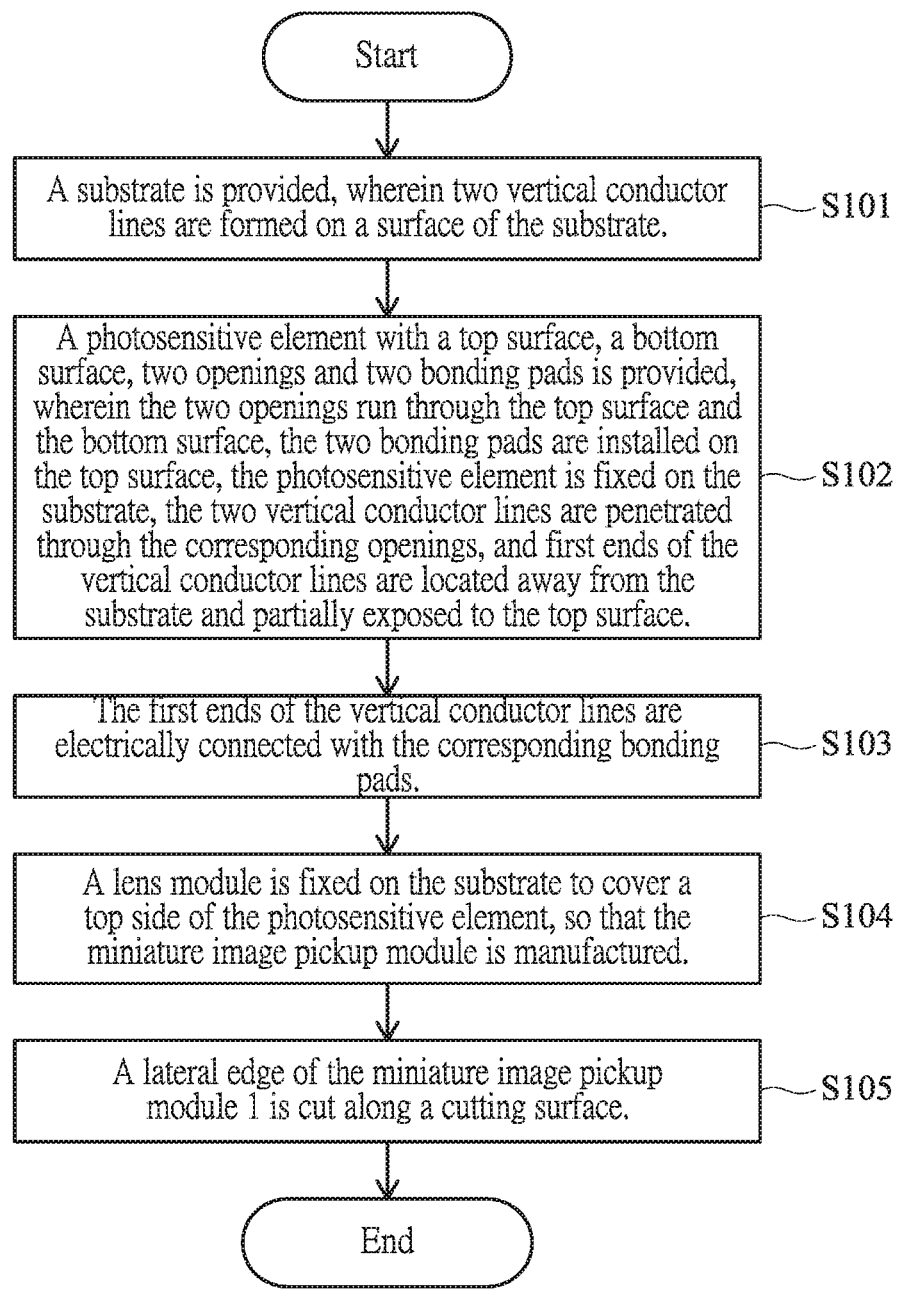
FIG. 1 is a flowchart illustrating a manufacturing method of a miniature image pickup module according to an embodiment of the present invention.
Figures 1, 2A:
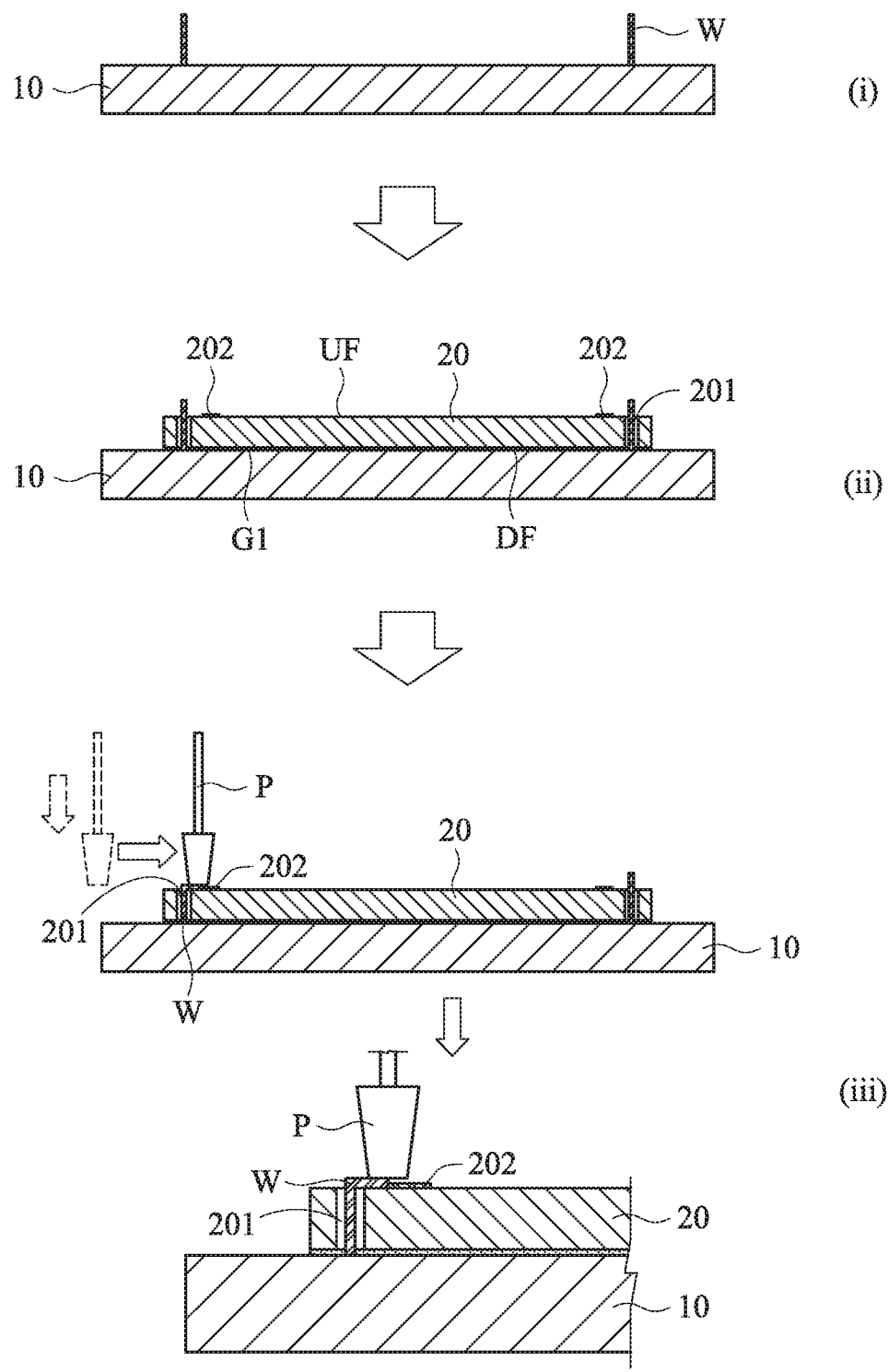
Figures 2, 2A:
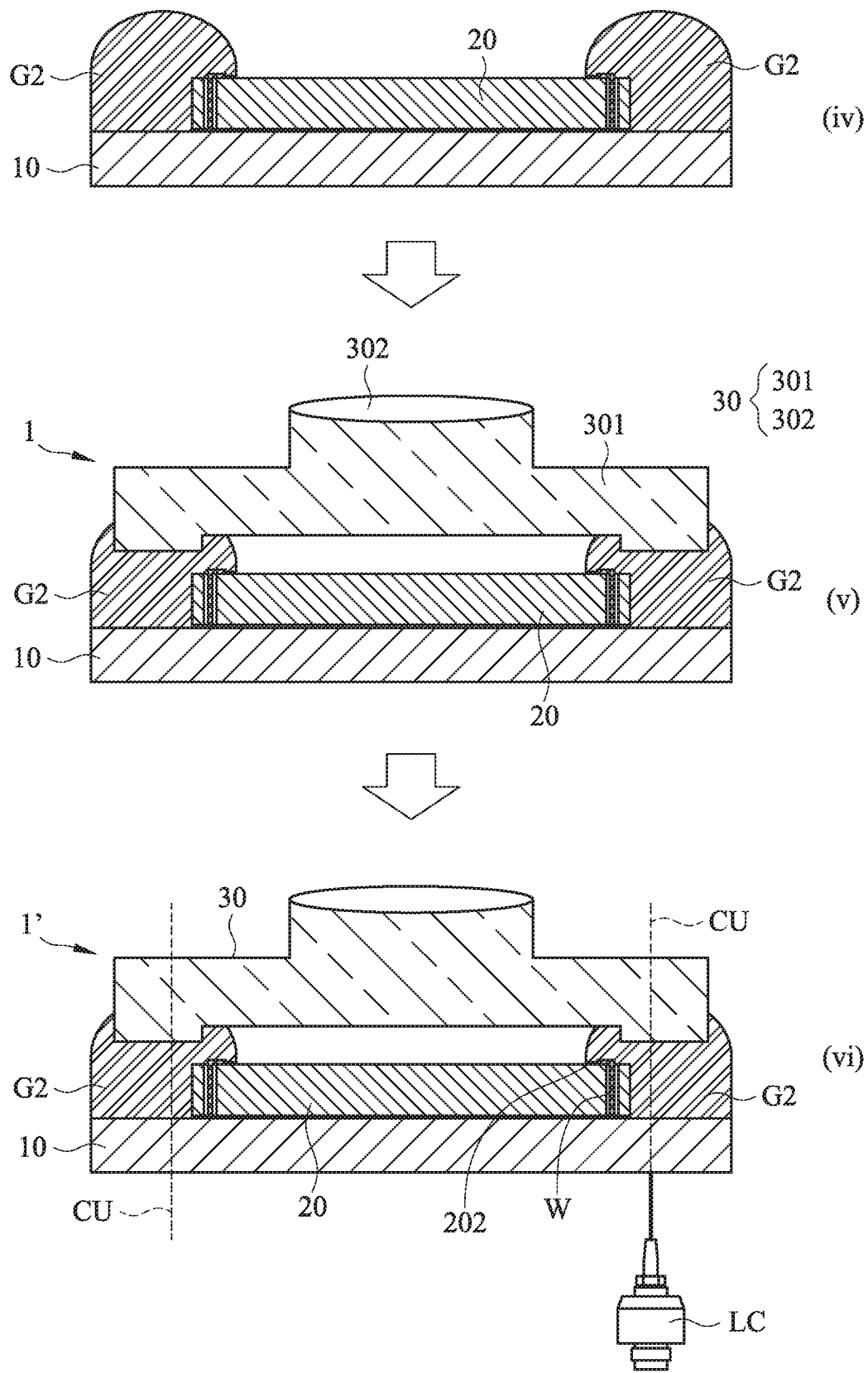

Please refer to FIGS. 1, 2A-1 and 2A-2. FIG. 1 is a flowchart illustrating a manufacturing method of a miniature image pickup module according to an embodiment of the present invention. FIGS. 2A-1 and 2A-2 schematically illustrate the steps of the manufacturing method of the miniature image pickup module according to a first embodiment of the present invention.

Please refer to FIG. 1. Firstly, a substrate 10 is provided. Moreover, two vertical conductor lines W are formed on a surface of the substrate 10 (Step S101). In the step S101, the substrate 10 is a printed circuit board (PCB), a bismaleimide triazine resin substrate (BT) or a rigid-flex PCB. As shown in FIG. 2A-1 (i), the vertical conductor lines W are perpendicular to the surface of the substrate and electrically connected with electrical traces (not shown) of the substrate 10. In an embodiment, the vertical conductor lines W are made of flexible metallic material. Consequently, the vertical conductor lines W can be bent arbitrarily. When the vertical conductor lines W are bent, the shapes of the vertical conductor lines W in the bent state can be maintained.

Then, a step S102 is performed. A photosensitive element 20 is provided. The photosensitive element 20 comprises a top surface UF, a bottom surface DF, two openings 201 and two bonding pads 202. The two openings 201 run through the top surface UF and the bottom surface DF. The two bonding pads 202 are installed on the top surface UF. The photosensitive element 20 is fixed on the substrate 10, and the two vertical conductor lines W are penetrated through the two openings 210. Moreover, the ends of the vertical conductor lines W away from the substrate 10 are partially exposed to the top surface UF. For illustration, the ends of the vertical conductor lines W away from the substrate 10 are referred hereinafter as the first ends of the vertical conductor lines W. In the step S102, a first glue layer G1 is arranged between the bottom surface DF of the photosensitive element 20 and the substrate 10. Consequently, the photosensitive element 20 and the substrate 10 are combined together. Preferably but not exclusively, the photosensitive element 20 is a charge-coupled device (CCD) or a CMOS active pixel sensor. For example, the first glue layer G1 is made of underfill. The vertical conductor lines W are penetrated through the corresponding openings 210. Especially, the vertical conductor lines W are not contacted with the inner walls of the openings 201. Moreover, as shown in FIG. 2A-1 (ii), the first ends of the vertical conductor lines W are partially exposed to the top surface UF.

Then, the first ends of the vertical conductor lines W are electrically connected with the corresponding bonding pads 202 (Step S103). In the step S103, an operating lever P is used for bending the first ends of the vertical conductor lines W, and thus the first ends of the vertical conductor lines W are bent toward the corresponding bonding pads 202. Moreover, the bent portions of the vertical conductor lines W are pressed by the operating lever P. Consequently, as shown in FIG. 2A-1 (iii), the first ends of the vertical conductor lines W are contacted with and electrically connected with the corresponding bonding pads 202. In this embodiment, the bonding pads 202 are located beside the corresponding openings 201. It is noted that numerous modifications and alterations may be made while retaining the teachings of the invention. For example, the positions of the bonding pads 202 are adjusted according to the lengths of the first ends of the vertical conductor lines W. If the first end of the vertical conductor line W is longer, the distance between the bonding pad 201 and the corresponding opening 201 is longer.

Then, a lens module 30 is fixed on the substrate 10 to cover the top side of the photosensitive element 20, and thus the miniature image pickup module 1 is fabricated (Step S104). In the step S104, a second glue layer G2 is dispensed on the surface of the substrate 10 at the outer side of the photosensitive element 20 (see FIG. 2A-2 (iv)). Moreover, a portion of the second glue layer G2 is spread to cover the first ends of the vertical conductor lines W and the bonding pads 202. Since the first ends of the vertical conductor lines W and the bonding pads 202 are protected by the second glue layer G2, the vertical conductor lines W and the bonding pads 202 are not oxidized, or the vertical conductor lines W and the bonding pads 202 are not corroded by the moisture. Then, the lens module 30 is placed on the second glue layer G2. Through the second glue layer G2, the lens module 30 and the substrate 10 are combined together.

Consequently, as shown in FIG. 2A-2 (v), the miniature image pickup module 1 is fabricated. The second glue layer G2 is served as a thick barrier wall for isolating from the surroundings. For example, the second glue layer G2 is made of high viscosity epoxy resin. In an embodiment, the lens module 30 comprises a holder 301 and a lens group 302. The holder 301 is used for holding the lens group 302. The lens group 302 is installed on a top surface of the holder 301. When the lens module 30 is placed on the second glue layer G2, a bottom surface of the holder 301 is contacted and bonded with the second glue layer G2.

Then, a lateral edge of the miniature image pickup module 1 is cut along a cutting surface CU (Step S105). In the step S105, a laser cutting tool LC is used for cutting off a portion of the holder 301, a portion of the second glue layer G2 and a portion of the substrate 10 along the cutting surface CU (see FIG. 2A-2 (vi)). After the lateral edge of the miniature image pickup module 1 is cut along the cutting surface CU, the portion of the second glue layer G2 overflowing to the lateral edge of the miniature image pickup module 1 is removed and the width of the miniature image pickup module 1 is reduced. Consequently, a compact miniature image pickup module 1' with the reduced volume is obtained.

Figures 1, 2B:
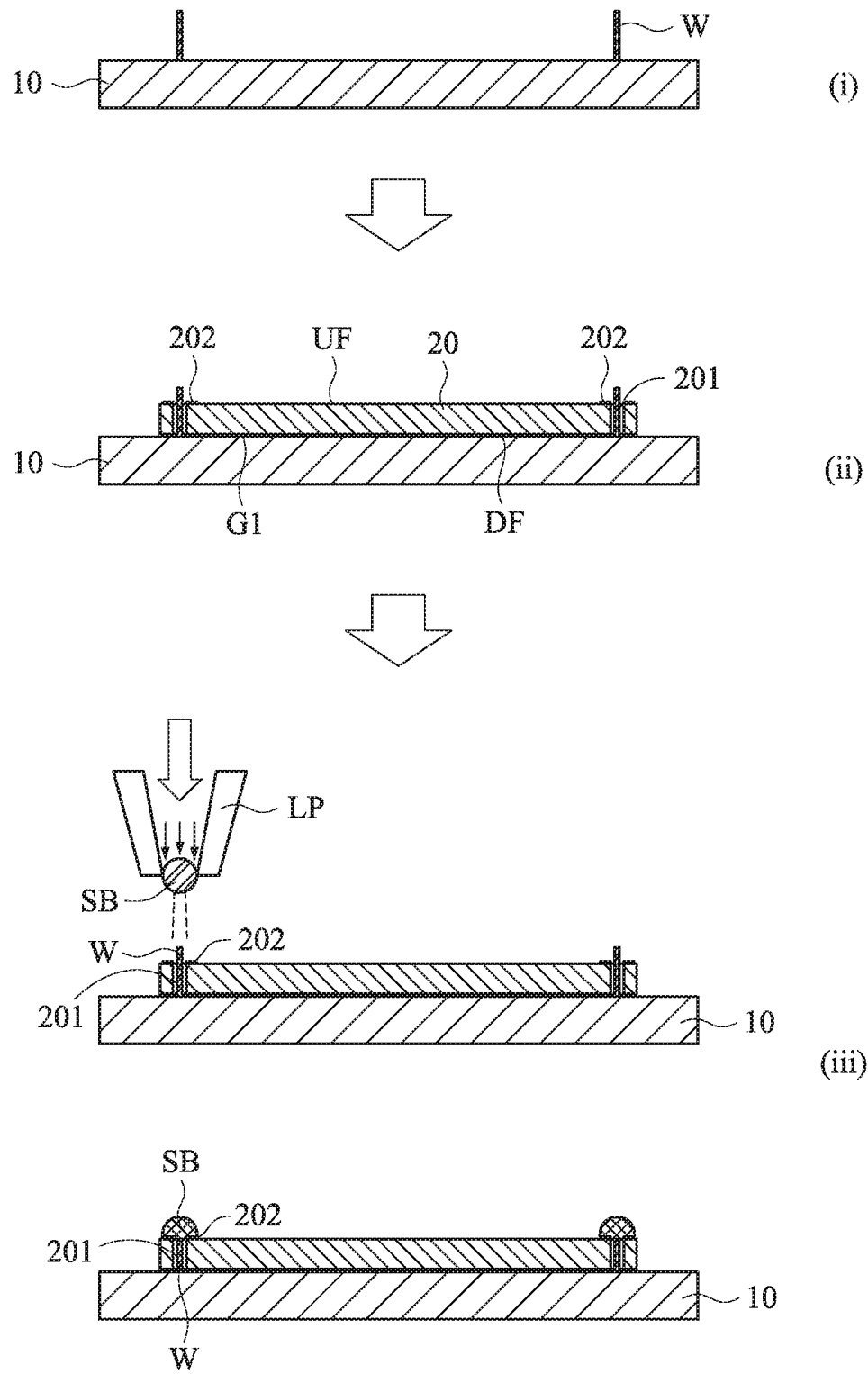
Figures 2, 2B:
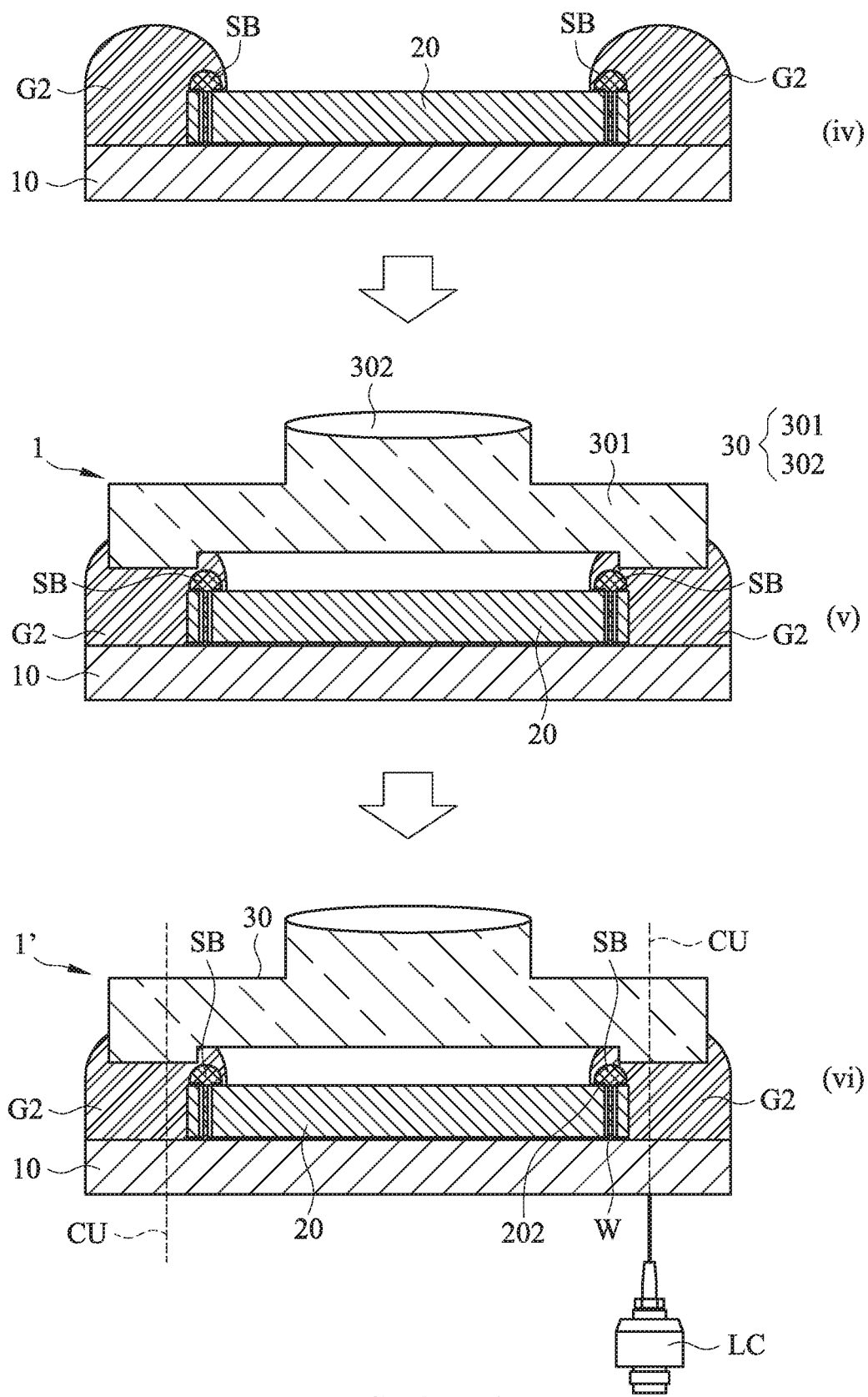

Please refer to FIGS. 1, 2B-1 and 2B-2. FIGS. 2B-1 and 2B-2 schematically illustrate the steps of the manufacturing method of the miniature image pickup module according to a second embodiment of the present invention. The functions and installation structures of the substrate 10, the photosensitive element 20 and the lens module 30 as shown in FIGS. 2B-1 and 2B-2 are similar to those of FIGS. 2A-1 and 2A-2, and are not redundantly described herein. In comparison with the first embodiment, the step as shown in FIG. 2B-1 (iii) is distinguished. As shown in FIG. 2B-1 (iii), a laser ball-mounting tool LP is used to dispense molten solder balls SB on the top surface UF of the photosensitive element 20. In addition, the first ends of the vertical conductor lines W and the bonding pads 202 are covered by the corresponding molten solder balls SB. After the molten solder balls SB are solidified, the solder balls SB are electrically connected with the first ends of the corresponding vertical conductor lines W and the corresponding bonding pads 202. As shown in FIG. 2B-2 (iv), a portion of the second glue layer G2 is also spread to cover the solder balls SB. Since the solder balls SB are protected by the second glue layer G2, the solder balls SB are not oxidized or corroded by the moisture.

Figure 3:
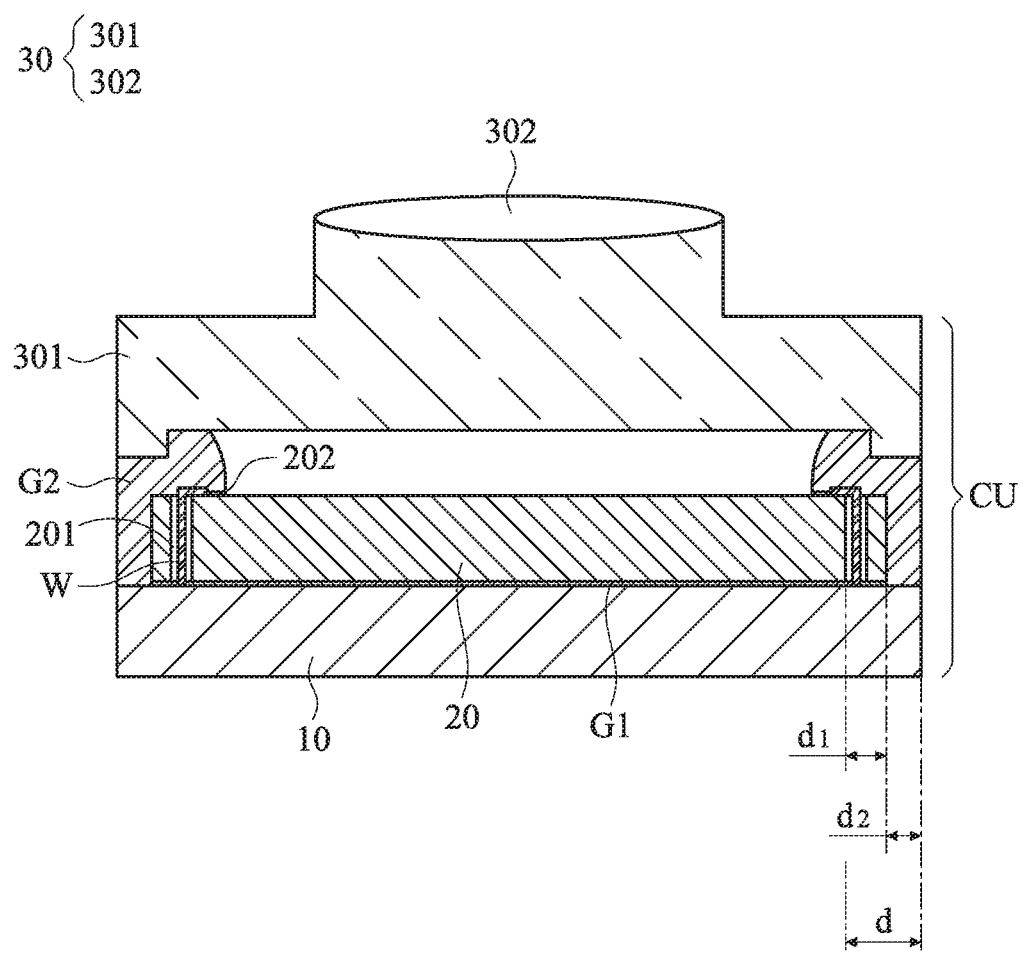
FIG. 3 is a schematic cross-sectional view illustrating the structure of a miniature image pickup module according to an embodiment of the present invention.

Please refer to FIG. 3. FIG. 3 is a schematic cross-sectional view illustrating the structure of a miniature image pickup module according to an embodiment of the present invention. As shown in FIG. 3, a portion of the second glue layer G2 of the miniature image pickup module 1' is spread to cover the first ends of the vertical conductor lines W and the bonding pads 202. Since the first ends of the vertical conductor lines W and the bonding pads 202 are protected by the second glue layer G2, the vertical conductor lines W and the bonding pads 202 are not oxidized, or the vertical conductor lines W and the bonding pads 202 are not corroded by the moisture. Moreover, after a portion of the holder 301, a portion of the second glue layer G2 and a portion of the substrate 10 are cut off along the cutting surface CU, the miniature image pickup module 1' with the reduced volume is obtained (see FIG. 2A-2 (vi)). Moreover, a first inner periphery of the opening 201 is close to a center line of the photosensitive element 20. The linear distance d between the first inner periphery of the opening 201 and the cutting surface CU is in the range between 0.15 mm and 0.20 mm. The linear distance d1 between the first inner periphery of the opening 201 and a lateral side of the photosensitive element 20 is in the range between 0.10 mm and 0.15 mm. The linear distance d2 between the lateral side of the photosensitive element 20 and the cutting surface CU is 0.05 mm. In a preferred embodiment, the linear distance d is 0.17 mm, the linear distance d1 is 0.12 mm, and the linear distance d2 is 0.05 mm.

From the above descriptions, the present invention provides the miniature image pickup module. In comparison with the conventional wire bonding process, the vertical conductor lines are penetrated through the photosensitive element according to the method of packaging the miniature image pickup module of the present invention. Since it is not necessary to retain the wire-bonding site on the substrate, the volume of the package structure of the photosensitive element is reduced. Moreover, since the bent structures of the vertical conductor lines are or the solder balls are electrically connected with the bonding pads, the conductor lines are not broken, the conductor lines are well brazed, and the photosensitive element is not damaged by the wire bonding tool. Under this circumstance, the production yield of the image pickup module is effectively enhanced. Moreover, since the laser cutting tool is used for cutting off a portion of the lateral edge of the miniature image pickup module, the volume of the miniature image pickup module is further reduced. Accordingly, the volume or thickness of the electronic device with the miniature image pickup module is reduced. In other words, the technology of the present invention is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A manufacturing method of a miniature image pickup module, the manufacturing method comprising steps of:
   (a) providing a substrate, wherein two vertical conductor lines are formed on a surface of the substrate;
   (b) providing a photosensitive element, wherein the photosensitive element comprises a top surface, a bottom surface, two openings and two bonding pads, wherein the two openings run through the top surface and the bottom surface, the two bonding pads are installed on the top surface, the photosensitive element is fixed on the substrate, the two vertical conductor lines are penetrated through the corresponding openings, and first ends of the vertical conductor lines are located away from the substrate and partially exposed to the top surface;
   (c) allowing the first ends of the vertical conductor lines to be electrically connected with the corresponding bonding pads; and
   (d) fixing a lens module on the substrate to cover a top side of the photosensitive element, so that the miniature image pickup module is manufactured.

2. The manufacturing method according to claim 1, further comprising a step (e) of cutting off a lateral edge of the miniature image pickup module along at least one cutting surface.

3. The manufacturing method according to claim 1, wherein the step (b) further comprises a step of forming a first glue layer between the bottom surface of the photosensitive element and the substrate, so that the photosensitive element and the substrate are combined together.

4. The manufacturing method according to claim 1, wherein the step (c) further comprises a step of bending the first ends of the vertical conductor lines and connecting the first ends of the vertical conductor lines with the corresponding bonding pads.

5. The manufacturing method according to claim 1, wherein the step (c) further comprises a step of forming solder balls on the top surface of the photosensitive element to cover the first ends of the corresponding vertical conductor lines and the corresponding bonding pads, so that the first ends of the corresponding vertical conductor lines are electrically connected with the corresponding bonding pads.

6. The manufacturing method according to claim 1, wherein in the step (d), the lens module comprises a lens group and a holder, wherein the lens group is held by the holder.

7. The manufacturing method according to claim 6, further comprising a step of forming a second glue layer on the substrate and an outer side of the photosensitive element, so that the holder is fixed on the substrate through the second glue layer and the lens module is aligned with the photosensitive element.

8. The manufacturing method according to claim 7, wherein a portion of the second glue layer is spread to cover the first ends of the vertical conductor lines and the bonding pads.

9. A miniature image pickup module, comprising:
   a substrate, wherein two vertical conductor lines are formed on a surface of the substrate;
   a photosensitive element fixed on the substrate, and comprising a top surface, a bottom surface, two openings and two bonding pads, wherein the two openings run through the top surface and the bottom surface, the two openings are aligned with the two vertical conductor lines, the two vertical conductor lines are penetrated through the corresponding openings, first ends of the vertical conductor lines are located away from the substrate and partially exposed to the top surface, and the two bonding pads are installed on the top surface; and
   a lens module fixed on the substrate to cover a top side of the photosensitive element,
   wherein the first ends of the vertical conductor lines are electrically connected with the corresponding bonding pads.

10. The miniature image pickup module according to claim 9, wherein the first ends of the vertical conductor lines are bent toward the corresponding bonding pads, so that the first ends of the vertical conductor lines are connected with the corresponding bonding pads.

11. The miniature image pickup module according to claim 9, wherein solder balls are formed on the top surface of the photosensitive element to cover the first ends of the corresponding vertical conductor lines and the corresponding bonding pads, so that the first ends of the corresponding vertical conductor lines are electrically connected with the corresponding bonding pads.

12. The miniature image pickup module according to claim 9, wherein a first glue layer is formed between the bottom surface of the photosensitive element and the substrate, so that the photosensitive element and the substrate are combined together.

13. The miniature image pickup module according to claim 9, wherein the lens module comprises a lens group and a holder, wherein the lens group is held by the holder.

14. The miniature image pickup module according to claim 13, wherein a second glue layer is formed on the substrate and an outer side of the photosensitive element, so that the holder is fixed on the substrate through the second glue layer and the lens module is aligned with the photosensitive element.

15. The miniature image pickup module according to claim 14, wherein a portion of the second glue layer is spread to cover the first ends of the vertical conductor lines and the bonding pads.

16. The miniature image pickup module according to claim 9, wherein at least one cutting surface is formed at a lateral edge of the miniature image pickup module.

17. The miniature image pickup module according to claim 16, wherein a first inner periphery of the opening is close to a center line of the photosensitive element, and a linear distance between the first inner periphery of the opening and the cutting surface is in a range between 0.15 mm and 0.20 mm.

18. The miniature image pickup module according to claim 17, wherein a linear distance between the first inner periphery of the opening and a lateral side of the photosensitive element is in a range between 0.10 mm and 0.15 mm.

19. The miniature image pickup module according to claim 17, wherein a linear distance between the lateral side of the photosensitive element and the cutting surface is 0.05 mm.

* * * * *